(12) United States Patent
Yu et al.

(10) Patent No.: US 10,029,549 B2
(45) Date of Patent: Jul. 24, 2018

(54) MIDDLE INSERT AND GLASS WINDOW

(71) Applicant: FUYAO GLASS INDUSTRY GROUP CO., LTD, Fuzhou (CN)

(72) Inventors: Yusheng Yu, Fuzhou (CN); Xianping Liu, Fuzhou (CN); Junlong Shen, Fuzhou (CN); Sikeng Li, Fuzhou (CN); Rongqiang Liu, Fuzhou (CN); Wenshu Ye, Fuzhou (CN)

(73) Assignee: FUYAO GLASS INDUSTRY GROUP CO., LTD, Fuzhou (CN)

( * ) Notice: Subject to any disclaimer, the term of this patent is extended or adjusted under 35 U.S.C. 154(b) by 0 days.

(21) Appl. No.: 15/108,891

(22) PCT Filed: Jul. 25, 2014

(86) PCT No.: PCT/CN2014/083031
§ 371 (c)(1),
(2) Date: Jun. 29, 2016

(87) PCT Pub. No.: WO2015/103867
PCT Pub. Date: Jul. 16, 2015

(65) Prior Publication Data
US 2016/0325609 A1    Nov. 10, 2016

(30) Foreign Application Priority Data

Jan. 7, 2014  (CN) .......................... 2014 1 0005813

(51) Int. Cl.
*B60J 10/18*    (2016.01)
*B60R 13/04*    (2006.01)
(Continued)

(52) U.S. Cl.
CPC ............. *B60J 10/18* (2016.02); *B60J 10/265* (2016.02); *B60J 10/45* (2016.02); *B60J 10/70* (2016.02); *B60R 13/04* (2013.01); *E06B 7/16* (2013.01)

(58) Field of Classification Search
CPC .... E04F 19/02; E04F 21/00; B60J 1/02; B60J 10/18; B60J 10/265; B60J 10/45;
(Continued)

(56) References Cited

U.S. PATENT DOCUMENTS 2,681,716 A * 6/1954 Black ...................... B60R 13/04
156/91
2,793,071 A * 5/1957 Meyer ...................... B60J 10/70
126/214 A
(Continued)

FOREIGN PATENT DOCUMENTS

CN    101228041 A    7/2008
CN    102272463 A    12/2011
(Continued)

*Primary Examiner* — Beth A Stephan
(74) *Attorney, Agent, or Firm* — Fish IP Law, LLP

(57) ABSTRACT

Disclosed are a middle insert (1) for mounting a light decoration strip (2) on a seal (3) of automobile glass, and a glass window containing the middle insert (1), the light decoration strip (2) and the seal (3), wherein the middle insert (1) comprises a first end part (11), a second end part (12), and a connecting part (13) used for connecting the first end part (11) and the second end part (12). The first end part (11) is provided with a first opening (14), the second end part (12) is provided with a second opening (15), and the first opening (14) and the second opening (15) respectively face the outsides of the end parts thereof. The middle insert (1) is simple in structure such that both complexity and labor costs are reduced.

10 Claims, 8 Drawing Sheets

(51) Int. Cl.
*B60J 10/265* (2016.01)
*B60J 10/70* (2016.01)
*B60J 10/00* (2016.01)
*E06B 7/16* (2006.01)

(58) Field of Classification Search
CPC ... B60J 10/70; B60J 1/007; B60J 1/008; B60J 1/006; B60J 1/30; B60R 13/04; B60R 13/06; E06B 7/16
USPC ..... 52/204.72, 204.7, 204.71, 204.5, 204.53, 52/204.591, 287.1, 288.1, 211, 208, 52/204.597, 312, 716.5, 716.6, 717.01; 296/201, 146, 146.15, 93, 1.08
See application file for complete search history.

(56) References Cited

U.S. PATENT DOCUMENTS

| | | | | | |
|---|---|---|---|---|---|
| 3,127,965 | A | * | 4/1964 | Weisenberger, Sr. | F16B 5/123 24/297 |
| 3,197,935 | A | * | 8/1965 | Clancy | F16B 5/121 24/297 |
| 3,606,431 | A | * | 9/1971 | Kunevicius | B60R 13/04 114/219 |
| 3,738,074 | A | * | 6/1973 | Tucker | B60R 13/0206 24/297 |
| 3,968,613 | A | * | 7/1976 | Meyer | B60J 1/18 52/204.597 |
| 4,055,285 | A | * | 10/1977 | Bott | B60R 9/04 224/326 |
| 4,197,688 | A | * | 4/1980 | Mauer | E06B 3/5481 24/292 |
| 4,249,356 | A | * | 2/1981 | Noso | B60J 10/265 24/295 |
| 4,251,101 | A | * | 2/1981 | Aotani | B60J 10/70 296/93 |
| 4,278,286 | A | * | 7/1981 | Kiba | B60J 10/265 296/93 |
| 4,349,993 | A | * | 9/1982 | Tanaka | E06B 3/5828 52/204.591 |
| 4,401,340 | A | * | 8/1983 | Ankrapp | B60J 10/70 296/93 |
| 4,436,337 | A | * | 3/1984 | Bowes | B60R 13/04 296/201 |
| 4,709,525 | A | * | 12/1987 | Adell | E04F 19/026 293/128 |
| 5,078,444 | A | * | 1/1992 | Shirahata | B29C 47/003 296/201 |
| 5,141,278 | A | * | 8/1992 | Iwata | B60J 1/02 296/208 |
| 6,546,683 | B1 | * | 4/2003 | Senge | B60J 1/10 52/204.591 |
| 7,004,535 | B1 | * | 2/2006 | Osterberg | B60R 13/04 296/203.03 |
| 7,918,058 | B2 | * | 4/2011 | Debailleul | B60J 10/235 296/146.15 |
| 2003/0024182 | A1 | * | 2/2003 | Yeany | E06B 1/30 52/204.67 |
| 2004/0168373 | A1 | * | 9/2004 | Tsuchida | B60J 1/008 49/489.1 |
| 2008/0196353 | A1 | * | 8/2008 | Debailleul | B60J 10/235 52/749.1 |
| 2009/0007511 | A1 | * | 1/2009 | Hause | B60J 10/265 52/312 |
| 2012/0153659 | A1 | * | 6/2012 | Senge | B60J 10/02 296/93 |
| 2013/0186018 | A1 | | 7/2013 | Grandgirard et al. | |

FOREIGN PATENT DOCUMENTS

| | | | | |
|---|---|---|---|---|
| CN | 102666071 A | | 9/2012 | |
| CN | 202926099 U | | 5/2013 | |
| CN | 203681435 U | | 7/2014 | |
| DE | 10300561 A1 | * | 7/2004 | ............ B60R 13/04 |
| DE | 102008026923 A1 | | 12/2009 | |
| DE | 102010011321 A1 | * | 9/2011 | ............ B60R 13/04 |
| EP | 1621407 A1 | | 2/2006 | |
| JP | 63297009 A | | 12/1988 | |
| WO | WO 2007/003823 | * | 11/2007 | ............ B60J 10/00 |

* cited by examiner

MIDDLE INSERT AND GLASS WINDOW

CROSS-REFERENCE TO RELATED APPLICATIONS

This present application claims the benefit of priority to Chinese Patent Application No. 201410005813.X filed in Chinese Patent Office on Jan. 7, 2014 and entitled "MIDDLE INSERT AND GLASS WINDOW", the content of which is hereby incorporated by reference in its entirety for all intended purposes.

TECHNICAL FIELD

The present invention relates to the field of mounting a decoration strip on a glass window, and in particular to a middle insert which is used for mounting a light decoration strip on a seal of automobile glass, and a glass window comprising the middle insert, the light decoration strip and the seal.

BACKGROUND

With development of automobile technology, requirements from people on security, comfortability and aesthetics of an automobile are higher and higher. A light decoration strip for an automobile window, as a type of decoration of the automobile, can improve the overall aesthetics of the automobile, and promote the grade of the automobile. The light decoration strip is usually mounted on the seal surrounding automobile window glass before delivery of the window glass. According to the prior art, a middle insert is usually adopted to fixedly connect the light decoration strip and the seal together, such that the window glass on which the light decoration strip is mounted can be easily installed into an automobile window after being delivered to an assembling plant, and a step of mounting the light decoration strip in the assembling plant is omitted.

According to the prior art, Chinese Patent CN1287531A disclosed a window unit mounted in a predesigned opening of motor vehicles and such like. The window unit comprises a window pane and a frame which is integratedly molded on the window pane. Retaining devices for retaining add-on parts are provided at several peripheral locations of the frame. Each retaining device is formed by a retaining strip and a retaining clip. The retaining strip is arranged on the outer side of the frame and permanently joined to the frame, for example by being partly molded in the frame. The retaining clip comprises an elongate base, on both longitudinal sides of which retaining wings and detent wings are positioned. The retaining wings serve for removably anchoring the retaining clips on the retaining strips, and the detent wings serve for removably connecting the add-on parts to the frame. The retaining device of this patent is equivalent to a middle insert.

Moreover, another Chinese Patent CN102272463A disclosed an intermediate fastening device for fitting an attachment, such as a trim, on a profiled strip. The intermediate fastening device comprises at least one clip having at least one upstream cooperating part configured to cooperate with the profiled strip and a downstream cooperating part configured to cooperate with the attachment. The upstream cooperating part comprises a plurality of catching tabs connected by a base part. The end of each tab is deformable. The tabs are deformed by applying a force to the ends of the tabs toward the material of the profiled strip in two opposed directions so as to penetrate the material of the profiled strip during the step of fastening the clip onto the profiled strip. The intermediate fastening device of this patent is equivalent to a middle insert.

However, in practical use, the devices equivalent to the middle insert disclosed by the two above patents have following disadvantages. Firstly, when being mounted, both ends of the light decoration strip need to be pressed downward at the same time to get snapped in, thereby resulting in difficult assembling operation, and after getting snapped in, the light decoration strip is not firmly clamped to the device equivalent to the middle insert and is easy to loosen, release or remove. Secondly, the device equivalent to the middle insert has complex shapes, such that the manufacturing process and installing process thereof become complex, thereby increasing the manufacturing cost. Thirdly, the light decoration strip cannot be firmly fixed due to the fixing way between the light decoration strip and the device equivalent to the middle insert, such that the shaking of the automobile itself may easily cause abnormal noise of the light decoration strip, thereby on one hand affecting the passengers' mood, and on the other hand reducing the service life thereof due to friction. Fourthly, the light decoration strip and the device equivalent to the middle insert is not longitudinally positioned relative to each other, such that the light decoration strip which is merely mounted on single edge of the glass may move longitudinally, thereby affecting the mounting accuracy of the light decoration strip.

SUMMARY

The technical problem to be solved by the present invention is to provide a middle insert, and a glass window comprising the middle insert, to overcome the disadvantages of existing middle insert, such as clamping unfirmly, having a complex structure, easily causing abnormal noise and easily sliding.

To overcome the technical problem, the technical solution adopted in the present invention is a middle insert for mounting a light decoration strip on a seal of a glass window, comprising a first end part provided with a first opening, a second end part provided with a second opening, and a connecting part used for connecting the first end part and the second end part; wherein the first opening and the second opening face the outsides of the first and second end parts, respectively.

Preferably, the opening depth of the first opening is greater than that of the second opening.

Preferably, a barrier part integratedly extends outwards from the underside of the first opening or the second opening; a groove opening upward is formed by the barrier part and the first opening or the second opening together; a projecting part is provided on the outer surface of the barrier part.

Preferably, at least two auxiliary holes are provided on the upper surface of the connecting part.

Preferably, the connecting part is provided with at least one concave section.

Moreover, the present invention further provides a glass window comprising a glass pane, a seal molded at least partially on the periphery of the glass pane, a middle insert fixed on the seal, and a light decoration strip mounted on the seal via the middle insert and comprising a first fixing part and a second fixing part; wherein the middle insert comprises a first end part provided with a first opening, a second end part provided with a second opening, and a connecting part used for connecting the first end part and the second end part; the first opening and the second opening face the outsides of the first and second end parts, respectively; the first fixing part is clamped into the first opening and the second fixing part is clamped into the second opening.

Preferably, the opening depth of the first opening is greater than that of the second opening.

Preferably, a barrier part integratedly extends outwards from the underside of the first opening or the second opening; a groove opening upward is formed by the barrier part and the first opening or the second opening together; a projecting part is provided on the outer surface of the barrier part; the projecting part is at least partially enwrapped by the seal.

Preferably, the middle insert and the seal are fixed on the periphery of the glass pane by integratedly molding.

Preferably, at least two auxiliary holes are provided on the upper surface of the connecting part of the middle insert.

Furthermore, the auxiliary holes are filled with binding material.

Preferably, the connecting part of the middle insert is at least partially enwrapped by the seal.

Furthermore, the seal enwrapping the connecting part is at least partially provided with a bulge or bulges on the upper surface; the bulge or bulges extend in the longitudinal direction of the light decoration strip; the clearance between the upper surface of the bulge or bulges and the lower surface of the light decoration strip is less than ±0.5 mm.

Furthermore, the connecting part of the middle insert is provided with at least one concave section.

Furthermore, a double-sided tape is provided between the portion of the upper surface of the seal where the middle insert is not provided and the lower surface of the light decoration strip.

Furthermore, at least one binding groove is provided on the portion of the upper surface of the seal where the middle insert is not provided; the binding groove is filled with binding material.

By adopting the above mentioned technical solutions the present invention has the following advantages. The middle insert according to the present invention is simple in structure such that both complexity and labor cost are reduced. By designing the opening depth of the first opening to be greater than that of the second opening, the light decoration strip is simply mounted and clamped firmly. By arranging a bulge or bulges on the seal, the clamping intensity of the light decoration strip is enhanced, so that it is guaranteed that the light decoration strip is difficult to loosen, release or remove. By arranging a binding groove and bind material or a double-sided tape on the seal, the light decoration strip is prevented from freely sliding on the seal, thereby guaranteeing the mounting accuracy of the light decoration strip at the edge and avoiding the abnormal noise.

Reference list: 1, middle insert; 11, first end part; 12, second end part; 13, connecting part; 14, first opening; 15, second opening; 16, barrier part; 17, groove; 18, projecting part; 19, auxiliary hole; 2, light decoration strip; 21, first fixing part; 22, second fixing part; 3, seal; 31, enwrapping part; 32, bulge; 4, glass pane; 5, double-sided tape; 6, binding groove; 61, binding material; 131, concave section; 132, first concave section; 133, second concave section.

DETAILED DESCRIPTION OF ILLUSTRATED EMBODIMENTS

Further description of the present invention will be illustrated hereinafter in conjunction with the drawings.

Figure 1:
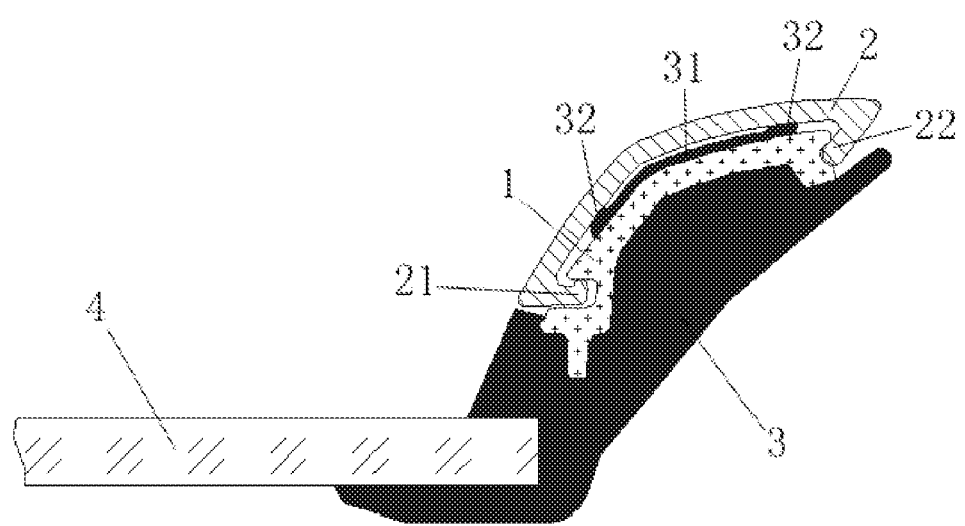
FIG. 1 is a partial cross-section view of a glass window comprising a middle insert, a light decoration strip and a seal according to the present invention.

Referring to FIG. 1, a middle insert 1 according to the present invention is used for mounting a light decoration strip 2 on a seal 3 of a glass window. The seal 3 is molded onto the periphery of a glass pane 4 by a specific apparatus or device. It is well known to the person skilled in the art that the seal 3 may be provided on the whole periphery of the glass pane 4, or may be provided on a part of the periphery of the glass pane 4, or even may be provided anywhere of the glass pane 4. The material of the seal 3 is conventionally chosen from thermo-plastic material (such as PVC, TPE etc.), polyurethane or synthetic rubber of EPDM type and so on, but not limited to them, and other suitable material is also applicable.

For improving the overall aesthetics of the automobile and promoting the grade of the automobile, the light decoration strip 2 may be provided on the part of the seal 3 which is visible from the exterior of the automobile. The light decoration strip 2 is used for covering the part of the seal 3 which is visible from the exterior of the automobile. Although the light decoration strip is specified in the present invention, the light decoration strip merely serves as one type of decoration of the automobile, and thus it is understood that the middle insert according to the present invention may be suitable for other types of decoration, even automobile glass attachment.

Figure 2:
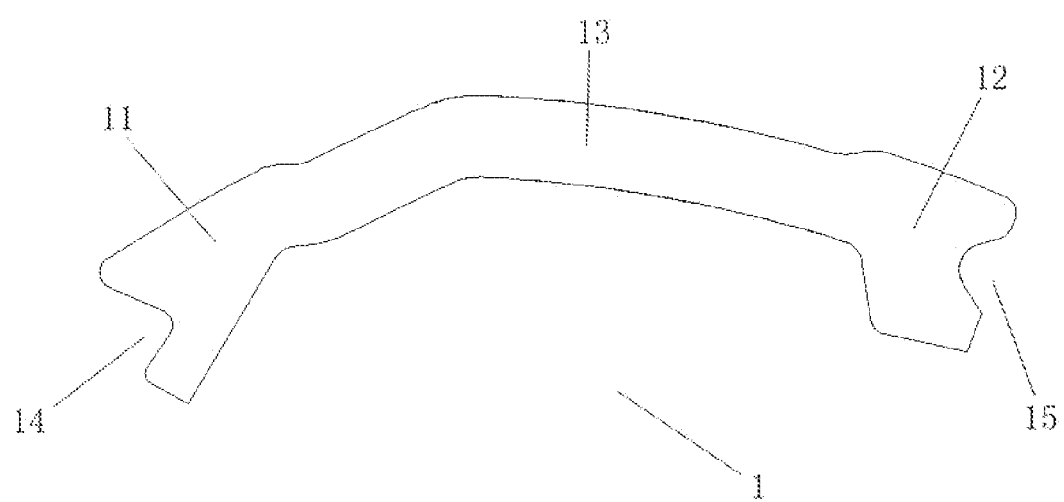
FIG. 2 is a front view of the middle insert according to the present invention.
Figure 3:
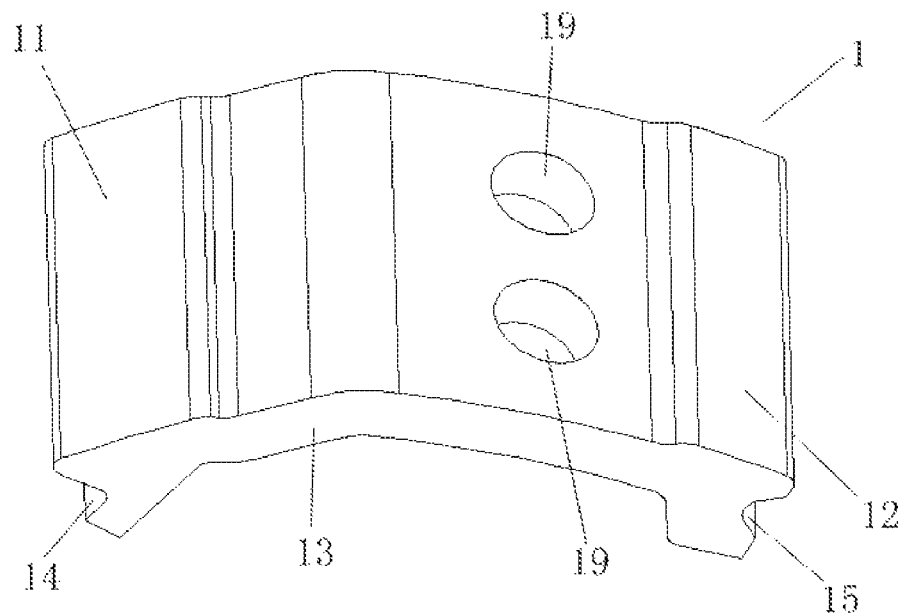
FIG. 3 is a structural schematic diagram of the middle insert according to the present invention.

For mounting the light decoration strip 2 on the seal 3 more firmly, the middle insert 1 is provided by the present invention. As shown in FIG. 2 and FIG. 3, the middle insert 1 comprises a first end part 11, a second end part 12 and a connecting part 13 used for connecting the first end part 11 and the second end part 12. The first end part 11 is provided with a first opening 14. The second end part 12 is provided with a second opening 15. The first opening 14 and the second opening 15 face the outsides of the first and second end parts, respectively. The first opening 14 and the second opening 15 is used for clamping the light decoration strip 2, thereby mounting the light decoration strip 2 on the seal 3.

Preferably, the opening depth of the first opening 14 is greater than that of the second opening 15. When being mounted, firstly the light decoration strip 2 is clamped into the first opening 14 with relatively greater open depth, then into the second opening 15 with relatively smaller open depth, such that the light decoration strip 2 is simply mounted and clamped firmly. Moreover, preferably, the first opening 14 and the second opening 15 are arranged to face the outsides of the first and second end parts respectively and downward, i.e. toward the direction away from the light decoration strip 2, so that the light decoration strip 2 can be mounted more firmly. The first opening 14 and the second opening 15 according to the present invention are described as two openings at both ends of the middle insert 1 for convenience, but the respective positions are not limited in practical application, which does not limit the scope of protection of the present invention.

Figure 4:
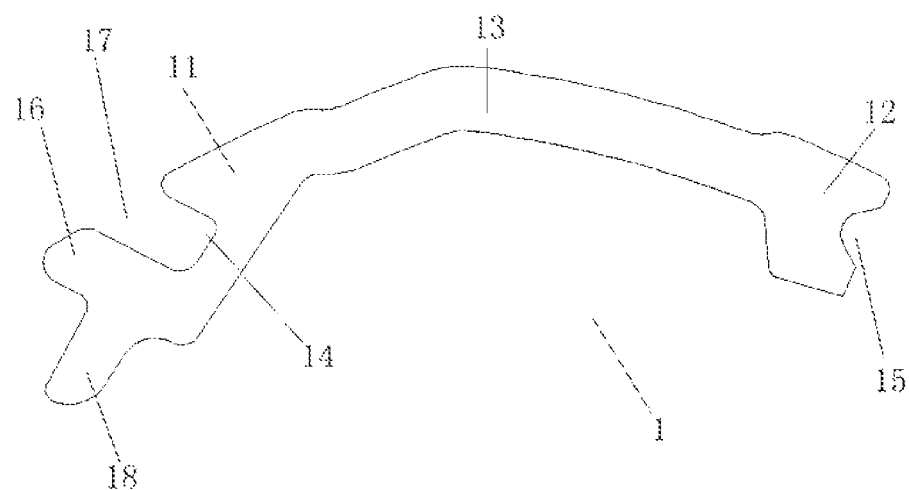
FIG. 4 is a front view of the middle insert provided with a barrier part and a projecting part according to the present invention.
Figure 5:
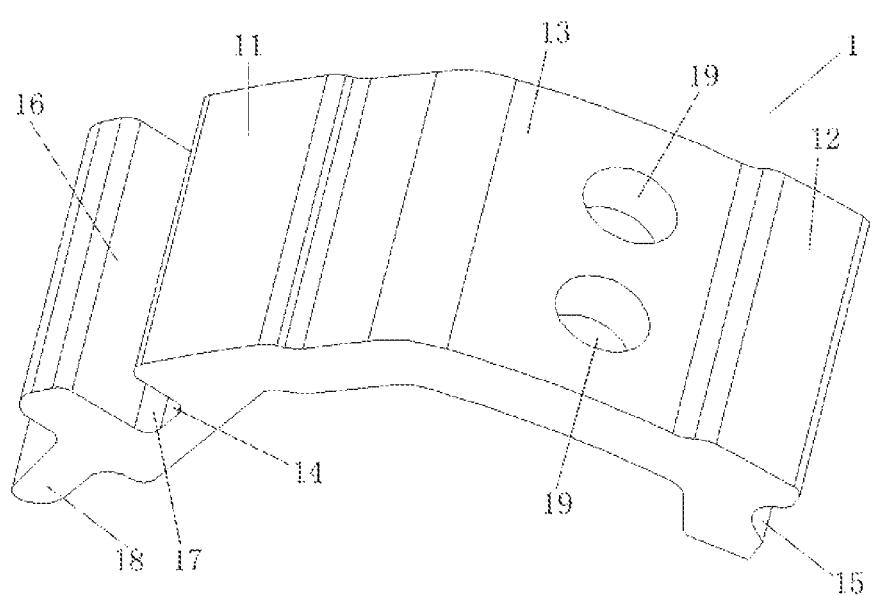
FIG. 5 is a structural schematic diagram of the middle insert provided with a barrier part and a projecting part according to the present invention.

As shown in FIG. 4 and FIG. 5, the first opening has an upper side face and a lower side face, and a barrier part 16 integratedly extends outwards from a lower end of the lower side face. A groove 17 opening upward is formed by the barrier part 16 and the first opening 14 together. A projecting part 18 is provided on the outer surface of the barrier part 16. It is understood that the barrier part 16 and the projecting part 18 may also be provided under the second opening 15, and a groove (not shown) opening upward may be formed by the barrier part 16 and the second opening 15 together, with a projecting part 18 provided on the outer surface of the barrier part 16. The groove 17 facilitates clamping the light decoration strip 2 into the middle insert 1. The projecting part 18 is at least partially enwrapped when being integratedly molded with the seal 3, which would enhance the connecting intensity between the middle insert 1 and the seal 3, thereby mounting the middle insert 1 on the seal 3 more firmly.

As shown in FIG. 3 and FIG. 5, at least two auxiliary holes 19 are provided on the upper surface of the connecting part 13. The auxiliary holes 19 are used to position the middle insert 1 when the middle insert 1 and the seal 3 are integratedly molded together, thereby guaranteeing the mounting accuracy of the middle insert 1 on the seal 3. It is understood that the auxiliary holes 19 may be through holes, or blind holes, according to practical manufacturing requirements.

The middle insert is described in detail in the above embodiments. Moreover, the present invention further provides a glass window comprising the above middle insert 1. As shown in FIG. 1, the glass window comprises the middle insert 1, the light decoration strip 2, the seal 3 and the glass pane 4. The middle insert 1 is fixed on the seal 3. The light decoration strip 2 comprises a first fixing part 21 and a second fixing part 22. The light decoration strip 2 is mounted on the seal 3 via the middle insert 1. The seal 3 is at least partially fixed on the periphery of the glass pane 4. The glass pane 4 according to the present invention is not limited to silicate glass. Other suitable transparent pane which could be installing in the opening portion of the automobile body, such as organic resin glass including PMMA, PC etc., is also applicable.

As shown in FIG. 2 and FIG. 3, the middle insert 1 comprises the first end part 11, the second end part 12 and the connecting part 13 used for connecting the first end part 11 and the second end part 12. The first end part 11 is provided with the first opening 14. The second end part 12 is provided with the second opening 15. The first opening 14 and the second opening 15 face the outsides of the first and second end parts, respectively. The first fixing part 21 is clamped into the first opening 14, and the second fixing part 22 is clamped into the second opening 15, thereby mounting the light decorating strip 2 on the seal 3.

Preferably, the opening depth of the first opening 14 is greater than that of the second opening 15. When the light decoration strip 2 being mounted, firstly the first fixing part 21 is clamped into the first opening 14, and then the second fixing part 22 is clamped into the second opening 15, such that the light decoration strip 2 is simply mounted and clamped firmly. Moreover, preferably, the first opening 14 and the second opening 15 are arranged to face the outsides of the first and second end parts respectively and downward, i.e. toward the direction away from the light decoration strip 2, so that the light decoration strip 2 can be mounted more firmly. The first opening 14 and the second opening 15 according to the present invention are described as two openings at both ends of the middle insert 1 for convenience, but the respective positions are not limited in practical application, which does not limit the scope of protection of the present invention.

As shown in FIG. 4 and FIG. 5, the first opening has an upper side face and a lower side face, and a barrier part 16 integratedly extends outwards from a lower end of the lower side face. A groove 17 opening upward is formed by the barrier part 16 and the first opening 14 together. A projecting part 18 is provided on the outer surface of the barrier part 16. As shown in FIG. 1, the first fixing part 21 is inserted in the groove 17 and clamped into the first opening 14, and the projecting part 18 is at least partially enwrapped by the seal 3. It is understood that the barrier part 16 and the projecting part 18 may also be provided under the second opening 15, and a groove (not shown) opening upward may be formed by the barrier part 16 and the second opening 15 together. The second fixing part 22 is inserted in the groove (not shown) and clamped into the second opening 15, and the projecting part 18 is at least partially enwrapped by the seal 3. The groove 17 facilitates clamping the light decoration strip 2 into the middle insert 1. The projecting part 18 is at least partially enwrapped when being integratedly molded with the seal 3, which would enhance the connecting intensity between the middle insert 1 and the seal 3, thereby mounting the middle insert 1 on the seal 3 more firmly.

Preferably, the middle insert 1 and the seal 3 are fixed on the periphery of the glass pane 4 by integratedly molding, so that the middle insert 1 and the seal 3 can be manufactured as a whole, and further assembling operation is unnecessary, thereby reducing the manufacturing time and labor.

As shown in FIG. 3 and FIG. 5, at least two auxiliary holes 19 are provided on the upper surface of the connecting part 13. The auxiliary holes 19 are used to position the middle insert 1 when the middle insert 1 and the seal 3 are integratedly molded together, thereby guaranteeing the mounting accuracy of the middle insert 1 on the seal 3. It is understood that the auxiliary holes 19 may be through holes, or blind holes, according to practical manufacturing requirements. Furthermore, the auxiliary holes 19 may be filled with binding material (not shown) which may be PU adhesive, silicon adhesive or other adhesive, or may be selected according to the material of the middle insert 1, the light decoration strip 2 and the seal 3. Generally, the binding force between the binding material and the light decoration strip 2 is relatively strong, but the binding force between the binding material and the seal 3 is weak. After the auxiliary holes 19 are filled with the binding material, as long as the binding performance between the binding material and the light decoration strip 2 is kept well, the light decoration strip 2 is restrained from moving longitudinally due to the binding intensity of the solidified binding material. Therefore, the binding material has good selectivity.

Preferably, as shown in FIG. 1, the connecting part 13 of the middle insert 1 is at least partially enwrapped by the seal 3. In FIG. 1, the connecting part 13 is enwrapped by an enwrapping part 31 of the seal 3. The enwrapping part 31 is located between the middle insert 1 and the light decoration strip 2. The enwrapping part 31 can enhance the connecting intensity between the middle insert 1 and the seal 3, thereby mounting the middle insert 1 on the seal 3 more firmly.

Furthermore, the seal 3 (i.e. the enwrapping part 31) enwrapping the connecting part 13 is at least partially provided with a bulge or bulges 32 on the upper surface. The bulge or bulges 32 extend in the longitudinal direction of the light decoration strip 2. The clearance between the upper surface of the bulge or bulges 32 and the lower surface of the light decoration strip 2 is less than ±0.5 mm. The aforementioned design is easy to implement in the manufacturing process, and it may be realized that the bulge or bulges 32 and the corresponding lower surface of the light decoration strip 2 are well fitted together after engagement, or when the light decoration strip 2 need to be pulled out. The light decoration strip 2 is under tense state when the bulge or bulges 32 and the corresponding lower surface of the light decoration strip 2 are well fitted together, which enhances the clamping intensity between the middle insert 1 and the light decoration strip 2, thereby guaranteeing that the light decoration strip 2 is difficult to loosen or release. Moreover, the force of the bulge or bulges 32 acting on the light decoration strip 2 is enhanced with the deformation of the light decoration strip 2, thereby guaranteeing that the light decoration strip 2 is difficult to remove.

Figure 6:
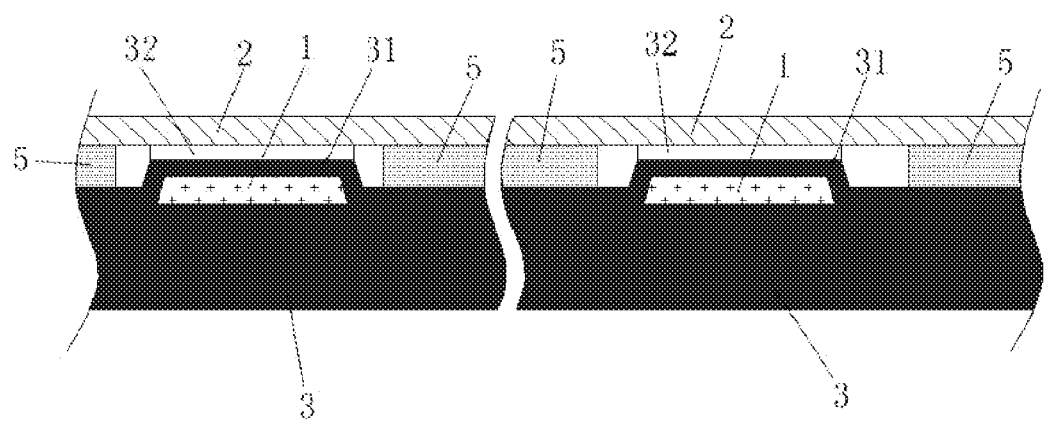
FIG. 6 is a partial cross-section view of the glass window according to the present invention where a double-sided tape is provided on the seal.

Furthermore, as shown in FIG. 6, a double-sided tape 5 is provided between the portion of the upper surface of the seal 3 where the middle insert 1 is not provided and the lower surface of the light decoration strip 2. One side of the double-sided tape 5 is adhered to the upper surface of the seal 3, and the other side is adhered to the lower surface of the light decoration strip 2, so that the light decoration strip 2 can be mounted more firmly, thereby avoiding the abnormal noise of the light decoration strip 2 caused by the shaking of the automobile itself, preventing the light decoration strip 2 from freely sliding on the seal 3, and guaranteeing the mounting accuracy.

Figure 7:
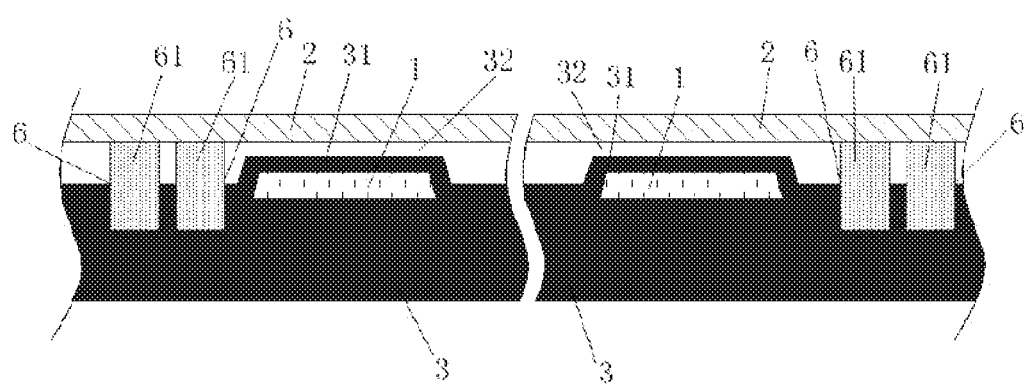
FIG. 7 is a partial cross-section view of the glass window according to the present invention where binding grooves and binding material are provided on the seal.

Furthermore, as shown in FIG. 7, at least one binding groove 6 is provided on the portion of the upper surface of the seal 3 where the middle insert 1 is not provided. The binding groove 6 is filled with the binding material 61. The binding material 61 may be PU adhesive, silicon adhesive or other adhesive or may be selected according to the material of the middle insert 1, the light decoration strip 2 and the seal 3. The upper surface of the binding material 61 and the lower surface of the light decoration strip 2 are bound together, so that the light decoration strip 2 can be mounted more firmly, thereby avoiding the abnormal noise of the light decoration strip 2 caused by the shaking of the automobile itself, preventing the light decoration strip 2 from freely sliding on the seal 3, and guaranteeing the mounting accuracy.

Figure 8:
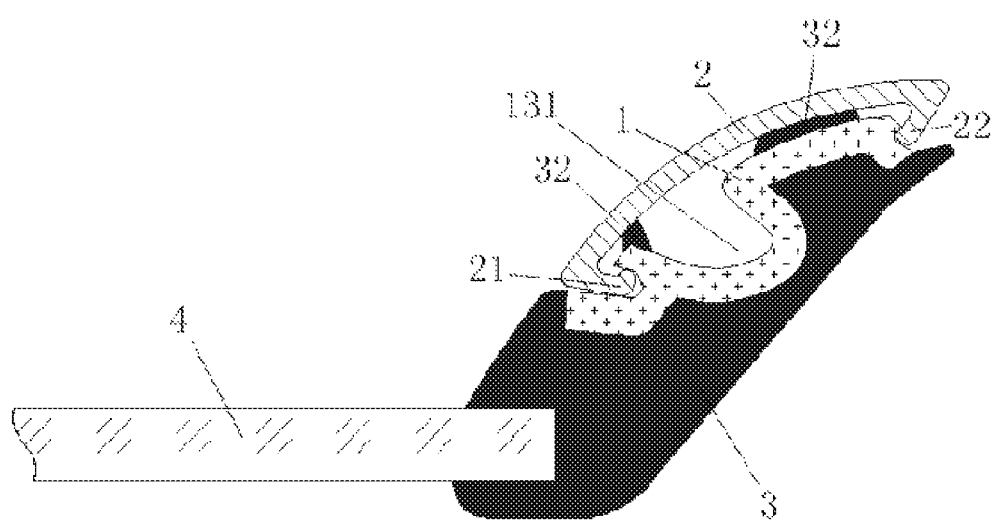
FIG. 8 is a partial cross-section view showing that a concave section is provided on connecting part of the middle insert, according to the present invention.
Figure 9:
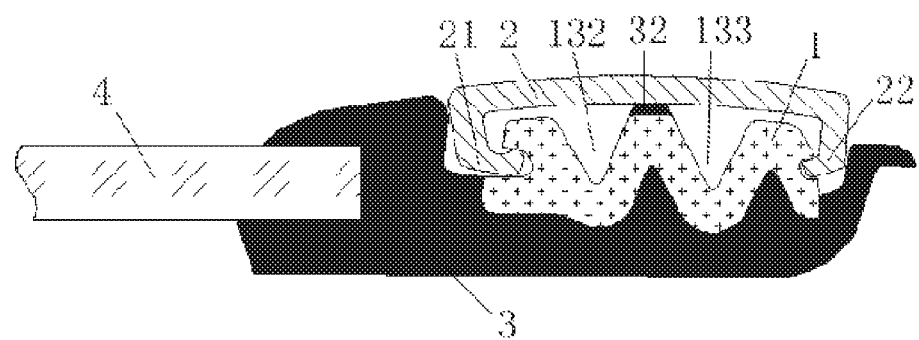
FIG. 9 is a partial cross-section view showing that two concave sections are provided on the connecting part of the middle insert, according to the present invention.

Moreover, in practical application, the glass window may be specifically designed to have different structures and shapes, and accordingly the middle insert 1 is designed differently. For meeting the practical requirements of the glass window, the connecting part 13 of the middle insert 1 is provided with at least one concave section. For example, as shown in FIG. 8, the connecting part 13 of the middle insert 1 is provided with one concave section 131. As shown in FIG. 9, the connecting part 13 of the middle insert 1 is provided with two concave sections, i.e. the first concave section 132 and the second concave section 133. The other parts of the middle insert 1 as shown in FIG. 8 and FIG. 9 are substantially identical with those of the middle insert 1 as shown in FIG. 1, and they both are used for mounting the light decoration strip 2 on the seal 3. It is understood that more concave sections meeting the requirements may be provided, and are not limited to the embodiments as illustrated in FIG. 8 and FIG. 9. The middle insert 1 with concave section(s) is adaptable to glass windows in different designs, thereby increasing the types of glass windows.

A detailed description in conjunction with the accompanying drawings is hereinbefore provided for the middle insert used for mounting the light decoration strip on the seal of the glass window, and the glass window comprising the middle insert, the light decoration strip and the seal. However, the invention is not limited to the above embodiments. Various improvements, equivalent modifications, replacements etc. according to the technical proposals of the present invention fall within the scope of the present invention.

What is claimed is:

1. A glass window, comprising:
   a glass pane,
   a seal molded at least partially on a periphery of the glass pane,
   a middle insert fixed on the seal, and
   a light decoration strip mounted on the seal via the middle insert and comprising a first fixing part and a second fixing part;
   wherein the middle insert comprises a first end part provided with a first opening, a second end part provided with a second opening, and a connecting part used for connecting the first end part and the second end part; the first opening and the second opening face outsides of the first and second end parts, respectively; the first fixing part is clamped into the first opening and the second fixing part is clamped into the second opening, and
   wherein at least one of the first opening and the second opening has an upper side face and a lower side face; a barrier part integratedly extends outwards from a lower end of the lower side face; a groove opening upward is formed by the barrier part and the at least one of the first opening and the second opening together; a projecting part is provided on an outer surface of the barrier part; the projecting part is at least partially enwrapped by the seal.

2. The glass window according to claim 1, wherein the middle insert and the seal are fixed on the periphery of the glass pane by integratedly molding.

3. The glass window according to claim 1, wherein at least two auxiliary holes are provided on an upper surface of the connecting part of the middle insert.

4. The glass window according to claim 3, wherein the auxiliary holes are filled with binding material.

5. The glass window according to claim 1, wherein the connecting part of the middle insert is at least partially enwrapped by the seal.

6. The glass window according to claim 5, wherein the seal enwrapping the connecting part is at least partially provided with a bulge or bulges on an upper surface; the bulge or bulges extend in the longitudinal direction of the light decoration strip; a clearance between an upper surface of the bulge or bulges and a lower surface of the light decoration strip is less than ±0.5 mm.

7. The glass window according to claim 5, wherein the connecting part of the middle insert is provided with at least one concave section.

8. The glass window according to claim 5, wherein a double-sided tape is provided between a portion of an upper surface of the seal where the middle insert is not provided and a lower surface of the light decoration strip.

9. The glass window according to claim 5, wherein at least one binding groove is provided on a portion of an upper surface of the seal where the middle insert is not provided; the binding groove is filled with binding material.

10. The glass window according to claim 1, wherein the first opening has an opening depth greater than that of the second opening.

* * * * *